(12) United States Patent
Feldkeller

(10) Patent No.: US 12,138,987 B2
(45) Date of Patent: Nov. 12, 2024

(54) HEAT EXCHANGER

(71) Applicant: MAHLE International GmbH, Stuttgart (DE)

(72) Inventor: Timo Feldkeller, Asperg (DE)

(73) Assignee: Mahle International GmbH, Stuttgart (DE)

( * ) Notice: Subject to any disclaimer, the term of this patent is extended or adjusted under 35 U.S.C. 154(b) by 225 days.

(21) Appl. No.: 17/887,186

(22) Filed: Aug. 12, 2022

(65) Prior Publication Data
US 2023/0050237 A1    Feb. 16, 2023

(30) Foreign Application Priority Data

Aug. 13, 2021    (DE) .................... 10 2021 208 924.0

(51) Int. Cl.
*B60H 1/00*    (2006.01)
*F28D 9/00*    (2006.01)
(52) U.S. Cl.
CPC ....... *B60H 1/00321* (2013.01); *F28D 9/0093* (2013.01); *B60H 1/00385* (2013.01)
(58) Field of Classification Search
CPC ............ B60H 1/00321; B60H 1/00385; B60H 1/00342; F28D 9/0093; F28D 9/005; F28F 27/02
See application file for complete search history.

(56) References Cited

U.S. PATENT DOCUMENTS

| | | | |
|---|---|---|---|
| 9,823,025 B2 | 11/2017 | Mueller | |
| 10,876,802 B2 | 12/2020 | Dolderer et al. | |
| 2016/0017156 A1* | 1/2016 | Dorfman | H01B 1/22 252/514 |
| 2021/0178853 A1 | 6/2021 | Heyl et al. | |

FOREIGN PATENT DOCUMENTS

| | | | | |
|---|---|---|---|---|
| DE | 102014004322 A1 | 10/2015 | | |
| DE | 102018206574 A1 | 10/2019 | | |
| DE | 102018129988 A1 | 1/2020 | | |
| EP | 2629032 A2 * | 8/2013 | ......... | B60H 1/00342 |
| KR | 20160017156 A * | 2/2016 | ................ | F01P 3/18 |

* cited by examiner

*Primary Examiner* — Emmanuel E Duke
(74) *Attorney, Agent, or Firm* — Muncy, Geissler, Olds & Lowe, P.C.

(57) ABSTRACT

A plate-type heat exchanger, in which plates are stacked on top of each other as a stack and connected to each other in a sealed manner, fluid channels being formed between adjacent plates in each case, the stack of plates being divided into a first stack region and a second stack region, the first stack region forming an evaporator having first fluid channels and second fluid channels, and the second stack region forming an internal heat exchanger having third fluid channels and fourth fluid channels.

15 Claims, 1 Drawing Sheet

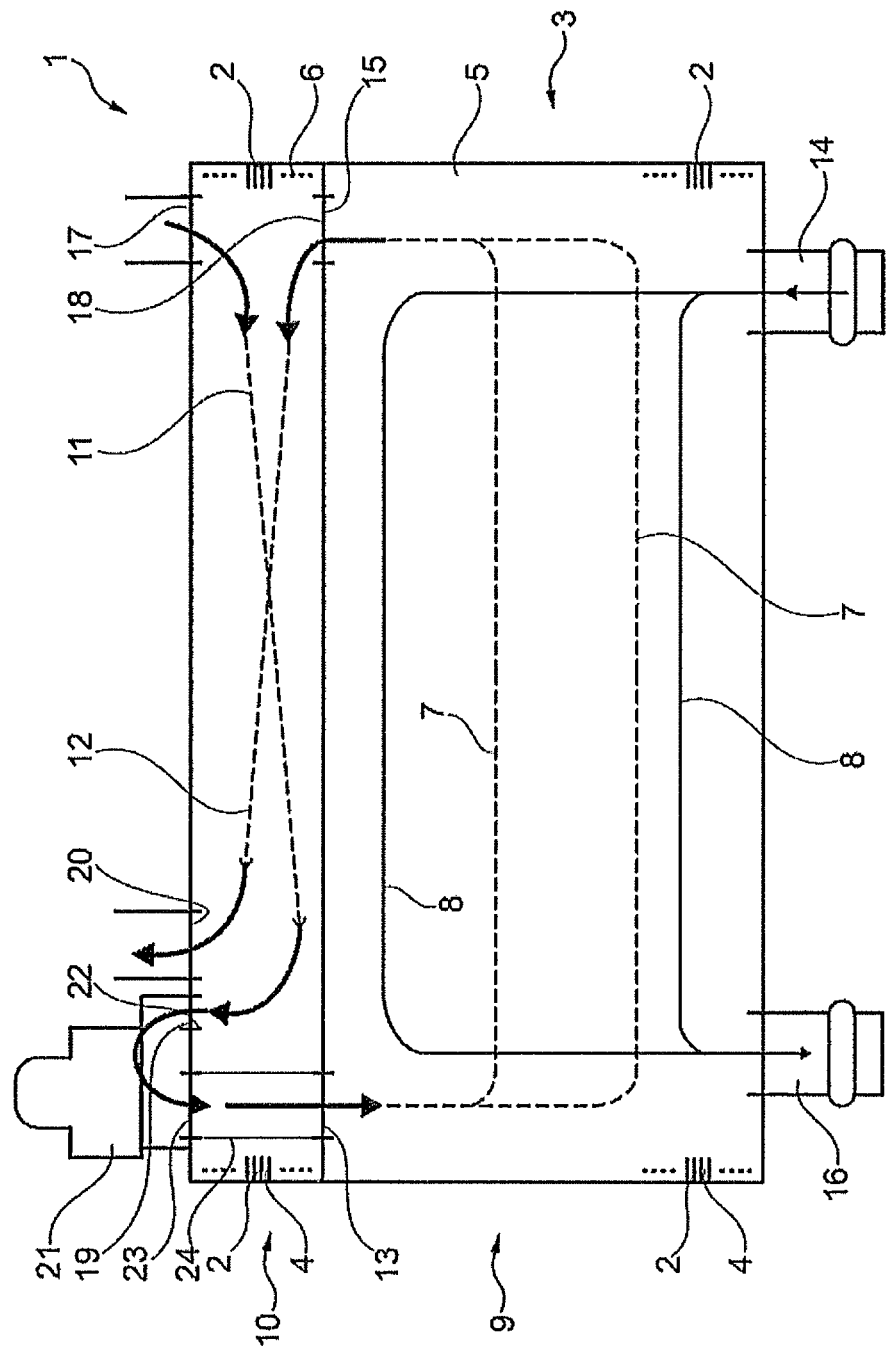

HEAT EXCHANGER

This nonprovisional application claims priority under 35 U.S.C. § 119(a) to German Patent Application No. 10 2021 208 924.0, which was filed in Germany on Aug. 13, 2021, and which is herein incorporated by reference.

BACKGROUND OF THE INVENTION

Field of the Invention

The present invention relates to a heat exchanger, in particular for a refrigerant circuit of a motor vehicle.

Description of the Background Art

In motor vehicles, refrigerant circuits are known, in which a condenser, an expansion valve and an evaporator and a compressor are interconnected to form a circuit. The liquid refrigerant coming from the condenser is expanded and cooled in the expansion valve and evaporated in the evaporator, a heat transfer between the refrigerant and a coolant taking place in the evaporator, so that the refrigerant evaporates at the output of the evaporator opposite the input of the evaporator and is usually also slighted heated, and the coolant at the output of the evaporator is cooled. The terms evaporator and chiller are used synonymously in the following.

Air, water or a water mixture, for example, may be used as the coolant of the evaporator.

The condenser re-cools the refrigerant compressed and heated by the compressor by means of heat transfer with a further fluid, for example also air, water or a water mixture, and condenses the refrigerant coming from the compressor, so that the refrigerant leaves the condenser in the liquid state.

Internal heat exchangers are frequently under discussion, in particular with respect to electric vehicles, which are very much geared toward efficiency, due to their limited range as a result of the vehicle battery. An internal heat exchanger of this type in the refrigerant circuit causes the warmer refrigerant coming from the condenser to enter into heat transfer with the colder refrigerant coming from the evaporator, so that the warmer refrigerant coming from the condenser is pre-cooled by the heat transfer with the warmer refrigerant coming from the evaporator and is at least slightly cooled thereby, the colder refrigerant coming from the evaporator being at least slightly heated by the heat transfer. This results in an increase in the efficiency of the refrigerant circuit, which indirectly has a positive effect on the range of the electric vehicle.

The term electric vehicle is understood to be a motor vehicle which permits a driving with the aid of an electric motor. These are purely electrically driven motor vehicles as well as motor vehicles including, for example, a hybrid drive, in which an electric driving and a non-electric driving is possible, for example with the aid of an internal combustion engine or the like.

However, installing an evaporator and an internal heat exchanger in the refrigerant circuit involves a high installation complexity, because the two heat exchangers must be manufactured separately, installed separately and connected to each other with the aid of piping or flexible tubing and be integrated into the refrigerant circuit. As a result, the installation and logistical costs increase, as does the installation space required, if an internal heat exchanger is used, so that longer piping or flexible tubing may be needed, which further increases the costs. Many vehicle manufacturers therefore dispense with the use of internal heat exchangers for reasons of cost and installation space.

SUMMARY OF THE INVENTION

It is therefore an object of the present invention to provide a heat exchanger, which is improved over the prior art and permits an efficient operation of a motor vehicle, in particular an electric vehicle.

An exemplary embodiment of the invention relates to a plate-type heat exchanger, in which plates are stacked on top of each other as a stack and connected to each other in a sealed manner, fluid channels being formed between adjacent plates in each case, the stack of plates being divided into a first stack region and into a second stack region, the first stack region forming an evaporator having first fluid channels and second fluid channels, and the second stack region forming an internal heat exchanger having third fluid channels and fourth fluid channels. A compact heat exchanger in a small installation space is achieved thereby, which forms an evaporator as well as an internal heat exchanger, in particular, fluid transitions between the evaporator and the internal heat exchanger being able to be ingeniously formed within the stack of plates for the purpose of avoiding further piping or flexible tubing. This not only saves manufacturing costs but also logistical and installation costs.

It is also advantageous if the first stack region is designed in such a way that the first fluid channels are designed for the through-flow of a refrigerant and the second fluid channels are designed for the through-flow of a coolant, the second stack region being designed in such a way that the third fluid channels are designed for the through-flow of the refrigerant in a first state, and the second fluid channels are designed for the through-flow of the refrigerant in a second state. Accordingly, the hydraulic diameter and/or possible structures of plates and/or the arrangement of turbulence inserts in the fluid channels are designed or carried out to be adapted to the participating fluids.

The first stack region of the stack is preferably designed to be connected directly to the second stack region of the stack.

The plates of the stack are, for example, soldered to each other.

In a further exemplary embodiment, it is also advantageous if the first stack region has a first port for supplying the refrigerant and a second port for supplying the coolant, and the first stack region has a third port for removing the refrigerant and a fourth port for removing the coolant, the second stack region having a fifth port for supplying the refrigerant in the first state and a sixth port for supplying the refrigerant in the second state, and the second stack region has a seventh port for removing the refrigerant in the first state and an eight port for removing the refrigerant in the second state. A port may be an opening, for example, in a plate, in the cover plate, etc., or it may be a nozzle, which is provided. A port may also be formed elsewhere.

It is advantageous, in particular, if an expansion element, for example an expansion valve, is furthermore provided for expanding the refrigerant, the expansion element having a ninth port for supplying the refrigerant to the expansion element and having a tenth port for removing the refrigerant from the expansion element. The expansion valve is advantageously part of the heat exchanger, for example connected to the stack as a structural unit, such as screwed, soldered, etc. to the stack.

The first port can be used to supply the refrigerant to the first fluid channels, and the third port is used to remove the refrigerant from the first fluid channels, the second port being used to supply the coolant to the second fluid channels, and the fourth port being used to remove the coolant from the second fluid channels, the fifth port being used to supply the refrigerant in the first state to the third fluid channels, and the seventh port being used to remove the refrigerant in the first state from the third fluid channels, the sixth port being used to supply the refrigerant in the second state to the fourth fluid channels, and the eighth port being used to remove the refrigerant in the second state from the fourth fluid channels. A suitable supply and removal of participating fluids thus takes place, such as the refrigerant and the coolant. The refrigerant in the first state is, for example, the refrigerant provided from the refrigerant circuit by the condenser and supplied to the internal heat exchanger. The refrigerant in the second state is, for example, the refrigerant provided by the evaporator and supplied to the internal heat exchanger. The refrigerant provided from the expansion element and supplied to the evaporator is referred to as the refrigerant without any further description of state, i.e., as supplied to the first stack region, which forms the evaporator having the first fluid channels and the second fluid channels.

The seventh port can be fluidically connected to the ninth port, so that refrigerant in the first state may flow into the expansion element, the tenth port being fluidically connected to the first port, so that the refrigerant expanded by the expansion element, which has flowed into the expansion element in the not yet expanded first state, may flow into the first fluid channels as refrigerant from the expansion element, the third port being fluidically connected to the sixth port, so that refrigerant may flow into the fourth fluid channels from the first fluid channels as refrigerant in the second state. An installation space-saving design is achieved thereby.

It is also advantageous if the first port is designed as an opening in a plate in the transition from the first stack region to the second stack region, the third port is designed as an opening in a plate in the transition from the first stack region to the second stack region, and the sixth port is designed as an opening in a plate in the transition from the first stack region to the second stack region. An installation space-saving design is achieved thereby with less complex manufacturing.

It is also advantageous if the fifth port and/or the eighth port and/or the seventh port is or are designed as opening(s) and/or nozzle(s) and/or flange(s) in the second stack region. An installation space-saving design is achieved thereby with less complex manufacturing.

It is also advantageous if the second port and/or the fourth port is or are designed as opening(s) and/or nozzle(s) and/or flange(s) in the first stack region. An installation space-saving design is achieved thereby with less complex manufacturing.

It is also advantageous if the ninth port and/or the tenth port is or are designed as opening(s) and/or nozzle(s) and/or flange(s) on the expansion element. An installation space-saving design is achieved thereby with less complex manufacturing.

It is particularly advantageous if the expansion element is fixedly connected to the stack of plates, in particular to the second stack region. A compact structural unit is achieved thereby, which reduces the installation and logistics costs.

It is also advantageous if the expansion element is arranged in such a way that the seventh port is situated opposite the ninth port. The connection may be simplified thereby with a direct overflow from the seventh port to the ninth port.

The tenth port can be fluidically connected to the first port via a connecting channel. This connecting channel is advantageous, in particular, because it does not permit a direct fluid connection between the tenth port and the first port.

It is particularly advantageous if the connecting channel traverses the second stack region, in particular if it is designed as an immersion tube which traverses the second stack region. The second stack region may be traversed thereby without fluid flowing through the connecting channel being influenced by the second stack region.

To optimize the heat transfer between fluids, it is also advantageous if the first fluid channels have a single-pass, double-pass, triple-pass or multi-pass design, and/or if the second fluid channels have a single-pass, double-pass, triple-pass or multi-pass design, and/or if the third fluid channels have a single-pass, double-pass, triple-pass or multi-pass design, and/or if the fourth fluid channels have a single-pass, double-pass, triple-pass or multi-pass design.

Further scope of applicability of the present invention will become apparent from the detailed description given hereinafter. However, it should be understood that the detailed description and specific examples, while indicating preferred embodiments of the invention, are given by way of illustration only, since various changes, combination and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a schematic representation of an exemplary embodiment of a heat exchanger according to the invention, including an evaporator, an internal heat exchanger and an expansion element.

DETAILED DESCRIPTION

The FIGURE shows a schematic representation of an exemplary embodiment of a heat exchanger 1 according to the invention.

Heat exchanger 1 has a plate-type design, in which plates 2 are stacked on top of each other as a stack 3 and are connected to each other in a sealed manner. Plates 2 are only indicated schematically. Plates 2 may be designed with a circumferential, raised edge or be provided with a different design for the purpose of forming stacked fluid channels 4 between plates 2 situated adjacent to each other in each case.

Stack 3 of plate 2 is divided into a first stack region 5 and into a second stack region 6.

First stack region 5 forms an evaporator 9 having first fluid channels 7 and having second fluid channels 8.

Second stack region 6 forms an internal heat exchanger 10 having third fluid channels 11 and fourth fluid channels 12.

First stack region 5 is designed in such a way that first fluid channels 7 are designed for the through-flow of a refrigerant, and second fluid channels 8 are designed for the through-flow of a coolant.

Second stack region 6 is designed in such a way that third fluid channels 11 are designed for the through-flow of the refrigerant in a first state, and second fluid channels 12 are designed for the through-flow of the refrigerant in a second state.

The refrigerant in the first state is, for example, the refrigerant provided by the condenser from the refrigerant circuit and supplied to internal heat exchanger 10. The refrigerant in the second state is, for example, the refrigerant provided by evaporator 9 and supplied to internal heat exchanger 10. The refrigerant supplied from an expansion element of the refrigerant circuit and supplied to evaporator 9 is referred to as the refrigerant without any further description of state, i.e., supplied to first stack region 5, which forms evaporator 9 having first fluid channels 7 and second fluid channels 8. The designation of the refrigerant, the refrigerant in the first state and the refrigerant in the second state is used to describe the refrigerant from a refrigerant circuit, i.e., basically the same fluid present in the refrigerant circuit in different states, i.e., temperature, pressure, etc.

The FIGURE furthermore shows that first stack region 5 has a first port 13 for supplying the refrigerant and a second port 14 for supplying the coolant. First stack region 5 also has a third port 15 for removing the refrigerant and a fourth port 16 for removing the coolant.

Second stack region 6 has a fifth port 17 for supplying the refrigerant in the first state and a sixth port 18 for supplying the refrigerant in the second state. Second stack region 6 also has a seventh port 19 for removing the refrigerant in the first state and an eighth port 20 for removing the refrigerant in the second state, so that the refrigerant leaves heat exchanger 1.

In addition, an expansion element 21 is provided for expanding the refrigerant, expansion element 21 having a ninth port 22 for supplying the refrigerant, i.e., the refrigerant in the first state, to expansion element 21, and expansion element 21 also having a tenth port 23 for removing the refrigerant expanded by expansion element 21 from expansion element 21.

Expansion element 21 is fixedly connected, for example, to stack 3 of plates 2, in particular to second stack region 6. Expansion element 21 may be screwed, soldered or otherwise connected to stack 3.

First port 13 is used to supply the refrigerant to first fluid channels 7. Third port 15 is used to remove the refrigerant from first fluid channels 7.

Second port 14 is used to supply the coolant to second fluid channels 8, and fourth port 16 is used to remove the coolant from second fluid channels 8.

Fifth port 17 is used to supply the refrigerant in the first state to third fluid channels 11, and seventh port 19 is used to remove the refrigerant in the first state from third fluid channels 11.

Sixth port 18 is used to supply the refrigerant in the second state to fourth fluid channels 12, and eighth port 20 is used to remove the refrigerant in the second state from fourth fluid channels 12, i.e., from heat exchanger 1.

Seventh port 19 is fluidically connected to ninth port 22, so that refrigerant in the first state may flow into expansion element 21, tenth port 23 being fluidically connected to first port 13, so that refrigerant may flow out of expansion element 21 into first fluid channels 7.

Third port 15 is fluidically connected to sixth port 18 so that refrigerant from first fluid channels 7 may flow into fourth fluid channels 12 as refrigerant in the second state. Third port 15 may be designed as an opening in a plate 2, and sixth port 18 may form the same opening in same plate 2 or a different opening in an adjacent plate 2, third port 15 being the outflow port from first stack region 5, and sixth port 18 being the inflow port into second stack region 6.

First port 13 is preferably designed as an opening in a plate 2 in the transition from first stack region 5 to second stack region 6, third port 15 is designed as an opening in a plate 2 in the transition from first stack region 5 to second stack region 6 on the side of first stack region 5, and sixth port 18 is designed as an opening in a plate 2 in the transition from first stack region 5 to second stack region 6 on the side of second stack region 6.

The transition from first stack region 5 to second stack region 6 may be formed by two plates 2, one plate 2 of first stack region 5 and one plate 2 of second stack region 6, so that corresponding ports 13, 15, 18 are designed as openings in corresponding plate 2 of corresponding stack region 5, 6.

Fifth port 17 and/or eight port 20 and/or seventh port 19 is or are designed, for example, as opening(s) and/or nozzle(s) and/or flange(s) in second stack region 6.

The refrigerant is supplied from the condenser of the refrigerant circuit, for example, on the side of stack 3, which forms internal heat exchanger 10. The same also applies, for example, to the removal of the refrigerant from heat exchanger 1.

Second port 14 and/or fourth port 16 is or are designed as opening(s) and/or nozzle(s) and/or flange(s) in first stack region 5.

Ninth port 22 and/or tenth port 23 is or are designed as opening(s) and/or nozzle(s) and/or flange(s) on expansion element 21.

For example, seventh port 19 is situated opposite ninth port 22, so that a direct overflow may take place.

Tenth port 23 is optionally fluidically connected to first port 13 via a connecting channel 24. Connecting channel 24 is arranged and designed in such a way that it traverses second stack region 6 for the purpose of effectuating an inflow of the refrigerant from expansion element 21 to first stack region 5. For this purpose, connecting channel 24 may be designed, for example, as an immersion tube, which traverses second stack region 6.

To optimize the pressure drop and the heat transfer, first fluid channels 7 have a single-pass, double-pass, triple-pass or multi-pass design, and/or second fluid channels 8 have a single-pass, double-pass, triple-pass or multi-pass design, and/or third fluid channels 11 have a single-pass, double-pass, triple-pass or multi-pass design, and/or fourth fluid channels 12 have a single-pass, double-pass, triple-pass or multi-pass design.

If third fluid channels 11 and fourth fluid channels 12 have a single-pass design, they may be passed through in co-current flow or in counter-current flow. This also applies if the number of passes of third fluid channels 11 and fourth fluid channels 12 is the same. A through-flow in co-current flow is shown in the FIGURE. If the number of passes is different, a through-flow of some passes or fluid channels would take place in co-current flow and other passes or fluid channels in counter-current flow.

If first fluid channels 7 and second fluid channels 8 have a single-pass design, they may be passed through in co-current flow or in counter-current flow. This also applies if the number of passes of first fluid channels 7 and second fluid channels 8 is the same. A through-flow in counter-current flow is shown in the FIGURE. If the number of passes is different, a through-flow of some passes or fluid channels would take place in co-current flow and other passes or fluid channels in counter-current flow.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plate-type heat exchanger comprising:
at least two plates stacked on top of each other as a stack and connected to each other in a sealed manner; and
at least one fluid channel being formed between adjacent plates,
wherein the stack of plates are divided into a first stack region and into a second stack region,
wherein the first stack region forms an evaporator having first fluid channels and second fluid channels, and
wherein the second stack region forms an internal heat exchanger having third fluid channels and fourth fluid channels.

2. The heat exchanger according to claim 1, wherein the first stack region is designed such that the first fluid channels are designed for the through-flow of a refrigerant and the second fluid channels are designed for the through-flow of a coolant, the second stack region being designed such that the third fluid channels are designed for the through-flow of the refrigerant in a first state, and the second fluid channels are designed for the through-flow of the refrigerant in a second state.

3. The heat exchanger according to claim 1, wherein the first stack region has a first port for supplying the refrigerant and a second port for supplying the coolant, and the first stack region has a third port for removing the refrigerant and a fourth port for removing the coolant, the second stack region having a fifth port for supplying the refrigerant in the first state and a sixth port for supplying the refrigerant in the second state, and the second stack region has a seventh port for removing the refrigerant in the first state and an eight port for removing the refrigerant in the second state.

4. The heat exchanger according to claim 3, wherein the first port is designed as an opening in a plate in the transition from the first stack region to the second stack region, the third port is designed as an opening in a plate in the transition from the first stack region to the second stack region, and the sixth port is designed as an opening in a plate in the transition from the first stack region to the second stack region.

5. The heat exchanger according to claim 3, wherein the fifth port and/or the eighth port and/or the seventh port is or are designed as opening(s) and/or nozzle(s) and/or flange(s) in the second stack region.

6. The heat exchanger according to claim 1, further comprising an expansion element for expanding the refrigerant, the expansion element having a ninth port for supplying the refrigerant to the expansion element and having a tenth port for removing the refrigerant from the expansion element.

7. The heat exchanger according to claim 6, wherein the ninth port and/or the tenth port is or are designed as opening(s) and/or nozzle(s) and/or flange(s) on the expansion element.

8. The heat exchanger according to claim 6, wherein the expansion element is fixedly connected to the stack of plates or to the second stack region.

9. The heat exchanger according to claim 8, wherein the seventh port is situated opposite the ninth port.

10. The heat exchanger according to claim 6, wherein the tenth port is fluidically connected to the first port via a connecting channel.

11. The heat exchanger according to claim 10, wherein the connecting channel traverses the second stack region or is designed as an immersion tube which traverses the second stack region.

12. The heat exchanger according to claim 1, wherein the first port is used to supply the refrigerant to the first fluid channels, and the third port is used to remove the refrigerant from the first fluent channels, the second port being used to supply the coolant to the second fluid channels, and the fourth port being used to remove the coolant from the second fluid channels, the fifth port being used to supply the refrigerant in the first state to the third fluid channels, and the seventh port being used to remove the refrigerant in the first state from the third fluid channels, the sixth port being used to supply the refrigerant in the second state to the fourth fluid channels, and the eighth port being used to remove the refrigerant in the second state from the fourth fluid channels.

13. The heat exchanger according to claim 1, wherein the seventh port is fluidically connected to the ninth port so that refrigerant in the first state flows into the expansion element, the tenth port being fluidically connected to the first port so that refrigerant flows into the first fluid channels from the expansion element, the third port being fluidically connected to the sixth port so that refrigerant flows into the fourth fluid channels from the first fluid channels as refrigerant in the second state.

14. The heat exchanger according to claim 1, wherein the second port and/or the fourth port is or are designed as opening(s) and/or nozzle(s) and/or flange(s) in the first stack region.

15. The heat exchanger according to claim 1, wherein the first fluid channels have a single-pass, double-pass, triple-pass or multi-pass design, and/or the second fluid channels have a single-pass, double-pass, triple-pass or multi-pass design, and/or the third fluid channels have a single-pass, double-pass, triple-pass or multi-pass design, and/or the fourth fluid channels have a single-pass, double-pass, triple-pass or multi-pass design.

* * * * *